US012564963B2

(12) United States Patent
Mao et al.

(10) Patent No.: US 12,564,963 B2
(45) Date of Patent: Mar. 3, 2026

(54) METHOD AND APPARATUS FOR TUNING ROBOT SYSTEM

(71) Applicant: ABB Schweiz AG, Baden (CH)

(72) Inventors: Yichao Mao, Shanghai (CN);
Shunchong Li, Shanghai (CN)

(73) Assignee: ABB Schweiz AG, Baden (CH)

( * ) Notice: Subject to any disclaimer, the term of this patent is extended or adjusted under 35 U.S.C. 154(b) by 250 days.

(21) Appl. No.: 18/041,390

(22) PCT Filed: Sep. 18, 2020

(86) PCT No.: PCT/CN2020/116149
§ 371 (c)(1),
(2) Date: Feb. 10, 2023

(87) PCT Pub. No.: WO2022/056823
PCT Pub. Date: Mar. 24, 2022

(65) Prior Publication Data
US 2023/0321835 A1     Oct. 12, 2023

(51) Int. Cl.
B25J 9/16          (2006.01)
(52) U.S. Cl.
CPC ................................... B25J 9/1692 (2013.01)
(58) Field of Classification Search
CPC .................. B25J 9/1692; B25J 9/1697; G05B 2219/39024; G05B 2219/39045
See application file for complete search history.

(56) References Cited

U.S. PATENT DOCUMENTS

| | | | |
|---|---|---|---|
| 2004/0230325 A1 | 11/2004 | Ramamoorthy et al. | |
| 2010/0161125 A1 | 6/2010 | Aoba et al. | |
| 2011/0218675 A1 | 9/2011 | Ban et al. | |
| 2016/0136812 A1 | 5/2016 | Hosek et al. | |
| 2016/0343273 A1* | 11/2016 | Stuart | A61B 34/30 |
| 2017/0173791 A1 | 6/2017 | Dalibard et al. | |
| 2018/0264649 A1* | 9/2018 | Ojima | B25J 9/1669 |
| 2018/0364731 A1 | 12/2018 | Liu et al. | |
| 2019/0143470 A1 | 5/2019 | Chen et al. | |
| 2019/0298160 A1 | 10/2019 | Ummalaneni et al. | |

(Continued)

FOREIGN PATENT DOCUMENTS

| | | |
|---|---|---|
| CN | 106707814 A | 5/2017 |
| CN | 107107336 A | 8/2017 |

(Continued)

*Primary Examiner* — Nhi Q Bui
(74) *Attorney, Agent, or Firm* — Greenberg Traurig, LLP

(57) ABSTRACT

Methods, apparatuses, systems, and computer readable media for tuning a robot system. In a method, sensed positions of a target that is processed by the robot system are collected from a sensor of the robot system during a movement of the robot system at a predetermined velocity and a predetermined accuracy. Robot positions of the robot system are collected from a controller of the robot system during the movement. Robot position estimations are obtained based on the robot positions and the sensed positions, the robot position estimations being associated with a sensor delay of the robot system caused by the sensor. The sensor delay is determined based on the sensed positions and the robot position estimations. Further, embodiments of present disclosure provide apparatuses, systems, and computer readable media for tuning a robot system.

20 Claims, 5 Drawing Sheets

100

(56)        References Cited

U.S. PATENT DOCUMENTS

2020/0139551  A1      5/2020  Doba
2020/0238530  A1 *    7/2020  Kumagai  ................. B25J 19/04

FOREIGN PATENT DOCUMENTS

CN           106604804  B      12/2019
CN           111136642  A       5/2020
CN           111496776  A       8/2020
CN           109434831  A      11/2020
CN           110913791  A      10/2021
CN           109084746  A       7/2023

* cited by examiner

100

200

700

800

900

METHOD AND APPARATUS FOR TUNING ROBOT SYSTEM

CROSS-REFERENCE TO RELATED APPLICATIONS

This is a national stage application claiming priority to International patent application Serial No: PCT/CN2020/116149, filed on Sep. 18, 2020, which is herein incorporated by reference in its entirety.

FIELD

Example embodiments of the present disclosure generally relate to a robot system, and more specifically, to methods, apparatuses, systems and computer readable media for tuning the robot system, such that the robot system may run in a more effective way.

BACKGROUND

With the development of computer and automatic control, robot systems have been widely used to process various types of objects in the manufacturing industry. For example, a tool may be equipped at an end arm of the robot system for cutting, grabbing and other operations. Vision-guided motion provides an important solution in automation, which improves the flexibility and accuracy of the robot system. However, to implement a high-performance controller in the robot system, engineers need to take much time and efforts to tune the control parameters (such as the time delay and other parameters). Especially, compared with the high speed movement of the robot system, the vision processing in some robot systems is relatively slow, and the low feedback frequency makes the robot system unable to achieve high efficiency.

There have been proposed several solutions for tuning the robot system. However, these solutions require rich knowledge about the controlling parameters in the robot system and it is hard for an inexperienced engineer to tuning the robot system independently. Therefore, it is desired to propose a more automatic way for tuning the robot system.

SUMMARY

Example embodiments of the present disclosure provide solutions for tuning a robot system.

In a first aspect, example embodiments of the present disclosure provide a method for tuning a robot system. The method comprises: collecting, from a sensor of the robot system, sensed positions of a target that is processed by the robot system during a movement of the robot system at a predetermined velocity and a predetermined accuracy; collecting, from a controller of the robot system, robot positions of the robot system during the movement; obtaining target position estimations based on the robot positions and the sensed positions, the target position estimations being associated with a sensor delay of the robot system caused by the sensor; and determining the sensor delay based on the target position estimations. With these embodiments, the engineer is not required to have rich knowledge about the controlling parameters, and the only thing needed to be done is to input a predefined velocity and an accuracy at which the robot system runs. As an important parameter for controlling the robot system, the sensor delay may be automatically determined by implementing the method of the present disclosure without any manual labor.

In some embodiments, obtaining the target position estimations comprises: determining robot position estimations based on a regression operation on the robot positions; and obtaining the target position estimations based on a geometry relationship between the robot position estimations and the sensed positions at a plurality of time points during the movement. With these embodiments, the problem of determining the sensor delay is converted into solving the target position formula, therefore the sensor delay may be determined in a simple and effective way.

In some embodiments, determining the sensor delay comprises: generating a target position formula based on a target position of the target and the target position estimations; and determining the sensor delay by solving the target position formula, such that the determined sensor delay minimizes the target position formula. As the above difference depends on a distance moved within the sensor delay, with these embodiments, the sensor delay may be determined by minimizing the difference in an effective way.

In some embodiments, the method further comprises: determining a corrected target position of the target at a given time point based on the sensor delay and a sensed position at the given time point. With these embodiments, the determined sensor delay may be used to correct a target position at a future time point so as to compensate errors in the target position caused by the sensor delay.

In some embodiments, the method further comprises: obtaining velocity commands for controlling the robot system at the plurality of time points; and determining a robot delay caused by the controller based on the velocity commands and the robot positions. As the robot delay affects an accuracy of the robot system, with these embodiments, the robot delay may be determined so as to further correcting movement of the robot system.

In some embodiments, obtaining the velocity commands comprises: with respect to a time point in the plurality of time points, identifying a position error of the robot system at the time point; and obtaining a velocity command in the velocity commands based on a comparison of the position error and the accuracy. The velocity commands are important parameters for controlling the robot system. With these embodiments, the velocity commend may be determined by a simple and effective way based on a comparison operation.

In some embodiments, identifying the position error comprises: identifying the position error based on a target position estimation and a robot position estimation at the time point. With these embodiments, target position and the robot position estimated at each time point may be used for determining the position error, therefore the position error may be determined in a fine granularity.

In some embodiments, determining the robot delay comprises: generating a robot position formula based on a geometry relationship between the robot delay, the robot positions, and the velocity commands at the plurality of time points; and determining the robot delay by solving the robot position formula, such that the determined robot delay minimizes the robot position formula. With these embodiments, a determination of the robot delay is converted into a problem of solving the robot position formula, and thus the robot delay may be determined in a simple and effective way.

In some embodiments, the method further comprises: determining a corrected robot position of the robot system at the given time point by updating a robot position of the robot system at the given time point with the robot delay and the velocity command at the given time point. With these embodiments, the determined robot delay may be used to correct a robot position at a future time point so as to compensate errors in the robot position caused by the robot delay.

In some embodiments, the method further comprises: determining a parameter for controlling the robot system based on the sensor delay and the robot delay, the parameter comprises any of: a buffer length of the robot system, strength for controlling the velocity commands, and a dead zone of the robot system. The sensor delay and the robot delay significantly affect the precision for controlling the robot system. With these embodiments, more controlling parameters may be determined based on the sensor delay and the robot delay, so as to ensure that the robot system may run in an accurate and effective way.

In a second aspect, example embodiments of the present disclosure provide an apparatus for tuning a robot system. The apparatus comprises: a sensed position collecting unit, being configured for collecting, from a sensor of the robot system, sensed positions of a target that is processed by the robot system during a movement of the robot system at a predetermined velocity and a predetermined accuracy; a robot position collecting unit, being configured for collecting, from a controller of the robot system, robot positions of the robot system during the movement; an obtaining unit, being configured for obtaining target position estimations based on the robot positions and the sensed positions, the target position estimations being associated with a sensor delay of the robot system caused by the sensor; and a determining unit, being configured for determining the sensor delay based on the target position estimations.

In some embodiments, a robot position estimating unit, being configured for determining robot position estimations based on a regression operation on the robot positions; and a target position estimating unit, being configured for obtaining the target position estimations based on a geometry relationship between the robot position estimations and the sensed positions at a plurality of time points during the movement.

In some embodiments, the determining unit comprises: a generating unit, being configured for generating a target position formula based on a target position of the target and the target position estimations; and a sensor delay determining unit, being configured for determining the sensor delay by solving the target position formula, such that the determined sensor delay minimizes the target position formula.

In some embodiments, the apparatus further comprises: a target position determining unit, being configured for determining a corrected target position of the target at a given time point based on the sensor delay and a sensed position at the given time point.

In some embodiments, the apparatus further comprises: a command obtaining unit, being configured for obtaining velocity commands for controlling the robot system at the plurality of time points; and a robot delay determining unit, being configured for determining a robot delay caused by the controller based on the velocity commands and the robot positions.

In some embodiments, the command obtaining unit comprises: an identifying unit, being configured for identifying a position error of the robot system at the time point with respect to a time point in the plurality of time points; and a velocity command obtaining unit, being configured for obtaining a velocity command in the velocity commands based on a comparison of the position error and the accuracy.

In some embodiments, the identifying unit comprises: an error identifying unit, being configured for identifying the position error based on a target position estimation and a robot position estimation at the time point.

In some embodiments, the robot delay determining unit comprises: a robot position formula generating unit, being configured for generating a robot position formula based on a geometry relationship between the robot delay, the robot positions, and the velocity commands at the plurality of time points; and a solving unit, being configured for determining the robot delay by solving the robot position formula, such that the determined robot delay minimizes the robot position formula.

In some embodiments, the apparatus further comprises: a robot position determining unit, being configured for determining a corrected robot position of the robot system at the given time point by updating a robot position of the robot system at the given time point with the robot delay and the velocity command at the given time point.

In some embodiments, the apparatus further comprises: a parameter determining unit, being configured for determining a parameter for controlling the robot system based on the sensor delay and the robot delay, the parameter comprises any of: a buffer length of the robot system, a strength for controlling the velocity commands, and a dead zone of the robot system.

In a third aspect, example embodiments of the present disclosure provide a system for tuning a robot system. The system comprises: a computer processor coupled to a computer-readable memory unit, the memory unit comprising instructions that when executed by the computer processor implements the method for tuning a robot system.

In a fourth aspect, example embodiments of the present disclosure provide a computer readable medium having instructions stored thereon, the instructions, when executed on at least one processor, cause the at least one processor to perform the method for tuning a robot system.

DESCRIPTION OF DRAWINGS

Throughout the drawings, the same or similar reference symbols are used to indicate the same or similar elements.

DETAILED DESCRIPTION OF EMBODIMENTS

Figure 1:
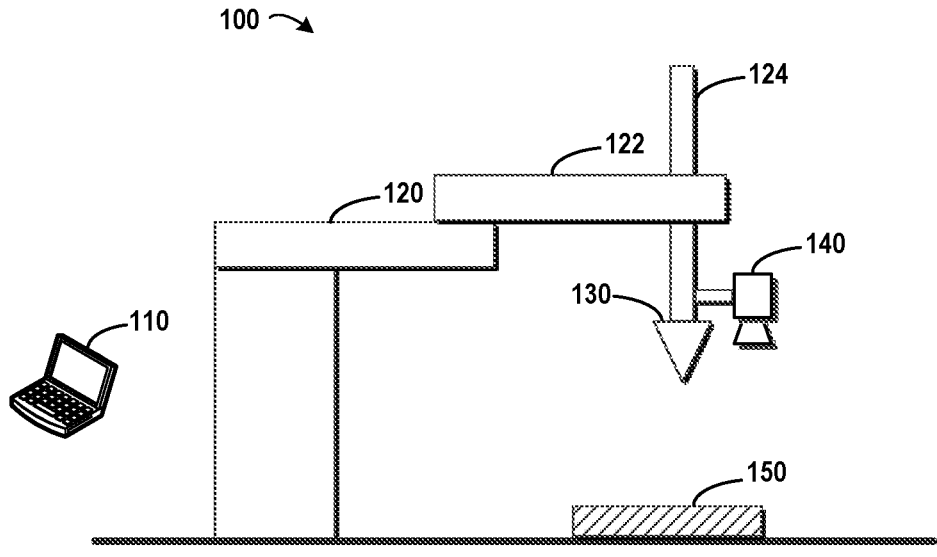
FIG. 1 illustrates a schematic diagram for a robot system in which embodiments of the present disclosure may be implemented.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1 to provide a general description of environment of the present disclosure. FIG. 1 illustrates a schematic diagram for a robot system 100 in which embodiments of the present disclosure may be implemented. In FIG. 1, the robot system 100 may comprise at least one arms 120, 122, ..., and 124, where the arm 120 is connected to a base of the robot system 100 via a joint, and the arm 122 is connected to the arm 120 via a joint. A tip of the end arm 124 may be equipped with a tool 130 for processing a target 150, such as a raw material that is to be shaped by the robot system 100. Here, the tool 130 may include, for example, a cutting tool for shaping the target 150 into a desired shape.

The robot system 100 may comprise a controller 110 for controlling components in the robot system 100. Further, the robot system 100 may comprise one or more sensor 140 for various purposes. For example, a vision sensor may be equipped at the end arm for sensing a position of the target 150. The sensed position may be returned to the robot system 100 for guiding movements of the robot system 100.

A special calibration procedure may be run initially to identify basic parameters of the robot system 100. Then, a tuning procedure may be run for determining further controlling parameters based on the basic parameters identified in the calibration procedure. However, the controlling parameters relate to various aspect of the robot system 100 and it is hard for an engineer without controlling background knowledge to set those parameters to desired values.

Figure 2:
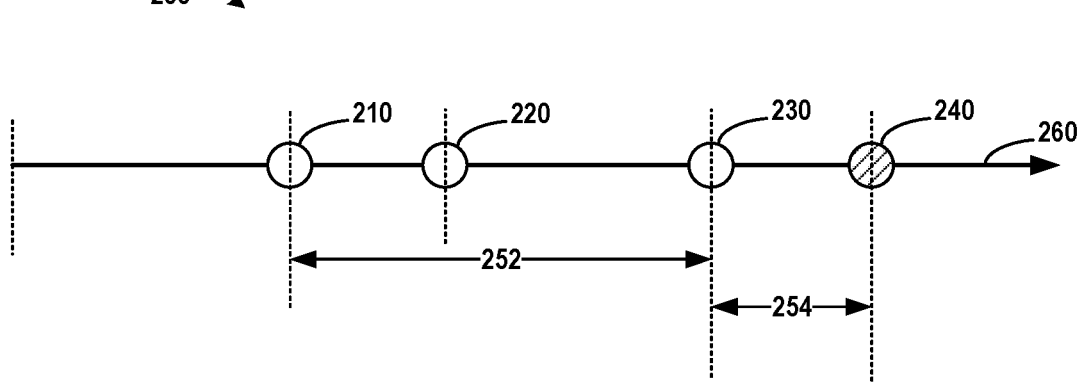
FIG. 2 illustrates a schematic diagram of positions in a movement of a robot system in accordance with embodiments of the present disclosure.

In the robot system 100, a sensor delay is an important parameter and is a base for configuring other parameters in the tuning procedure. Reference will be made to FIG. 2 for a brief description of the sensor delay in the robot system 100. FIG. 2 illustrates a schematic diagram 200 of positions in a movement of a robot system in accordance with embodiments of the present disclosure. In FIG. 2, the sensor 140 may collect images of the target 150 when the end arm of the robot system 100 is moving along a direction 260. In a time point, the sensor 140 may collect an image of the target 150 when the robot position is at a position 210. Here, the robot position may refer to a position of the end arm or the tool 130 at the end arm.

As image processing takes a while and the robot system 100 moves at a high speed, robot position may move from the position 210 to the position 220 during the image processing. Therefore, feedback of the robot system 100 may improperly indicate that the robot position reaches the position 220 when the sensor 140 collects the image. Here, sensed position of the target 150 indicated by the image may show that a distance between the sensor 140 and the target 150 is labeled by a distance 252 in FIG. 2. At this point, if the robot position 220 and the sensed position are directly used for determining the target position, the target will be estimated to be at a position 240 instead of the real target position 230. In turn, there will be an estimation error 254 between the real target position 230 and the estimated target position 240.

Here, the sensor delay relates to a time difference between the time point at which the image is collected by the sensor 140 and the time point at which the feedback is provided by the robot system 100. As the estimation error 254 greatly affects the precision in determining the real target position, the sensor delay should be determined and compensate.

In order to at least partially solve the above and other potential problems, a new method for tuning a robot system is provided according to embodiments of the present disclosure. In general, according to embodiments of the present disclosure, the engineer only needs to input a predetermined velocity and a predetermined accuracy for triggering the robot system 100. Further, parameters may be determined in an automatic way without a need for the engineer to have knowledge of each and every parameter.

Figures 3, 4:
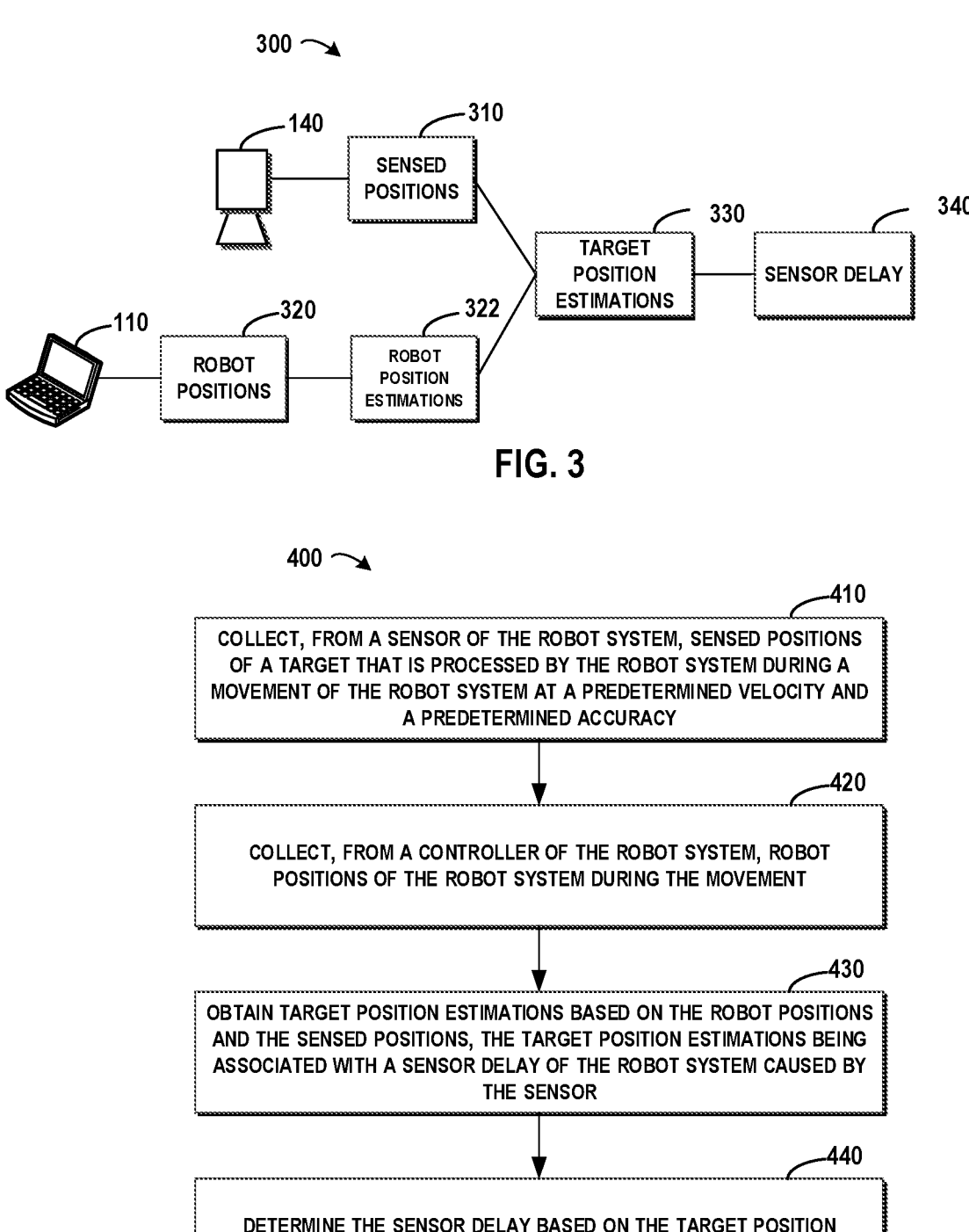
FIG. 3 illustrates a schematic diagram of a procedure for tuning a robot system in accordance with embodiments of the present disclosure.
FIG. 4 illustrates a flowchart of a method for tuning a robot system in accordance with embodiments of the present disclosure.

Reference will be made to FIG. 3 for a brief description of the present disclosure, where FIG. 3 illustrates a schematic diagram of a procedure 300 for tuning a robot system in accordance with embodiments of the present disclosure. In FIG. 3, the robot system 100 is triggered to run at the predetermined velocity and accuracy. During a movement of the robot system 100, sensed positions 310 of the target 150 and robot positions 320 are respectively collected from the sensor 140 and the controller 110 at various time points during the movement. As the sensor 140 may cause a sensor delay, robot position estimations 322 associated with the sensor delay 340 may be obtained based on the robot positions 320. Then, target position estimations 330 may be determined based on the sensed positions 310 and the robot position estimations 322. Further, the sensor delay 340 is determined based on target position estimations 330.

With these embodiments, the engineer is not required to have rich knowledge about the controlling parameters, and the engineer only needs to configure the robot system to the predefined velocity and accuracy. Compared with traditional solutions for tuning the robot system 100 in a manual way, the automatic tuning procedure in the present disclosure does not require the engineer to have rich background knowledge and thus free the engineer from heavy manual labor.

FIG. 4 illustrates a flowchart of a method 400 for tuning a robot system in accordance with embodiments of the present disclosure. At block 410, sensed positions 310 of the target 150 that is processed by the robot system 100 are collected from the sensor 140 during a movement of the robot system 100 at a predetermined velocity and a predetermined accuracy. The robot system 100 shows different errors when it is run at different velocities and accuracies, the faster the robot system 100 runs, the greater the error occurs. Therefore, the engineer may input the desired velocity and accuracy before the tuning procedure. Then, the robot system 100 may be triggered with the inputted velocity and accuracy and then the tuning procedure begins.

During the movement of the robot system 100, the sensor 140 may collect the sensed positions 310 at various time points according to a collecting frequency of the sensor 140, and each of the sensed positions 310 may be stamped with a timestamp associated with a time point at which the sensed position is collected. At block 420, as feedbacks come from the controller 110, the robot positions 310 of the robot system 100 are collected during the movement. Here, each of the robot positions 310 corresponds to one sensed position and the robot position is also stamped with a timestamp of a time point during the movement.

Figure 5A:
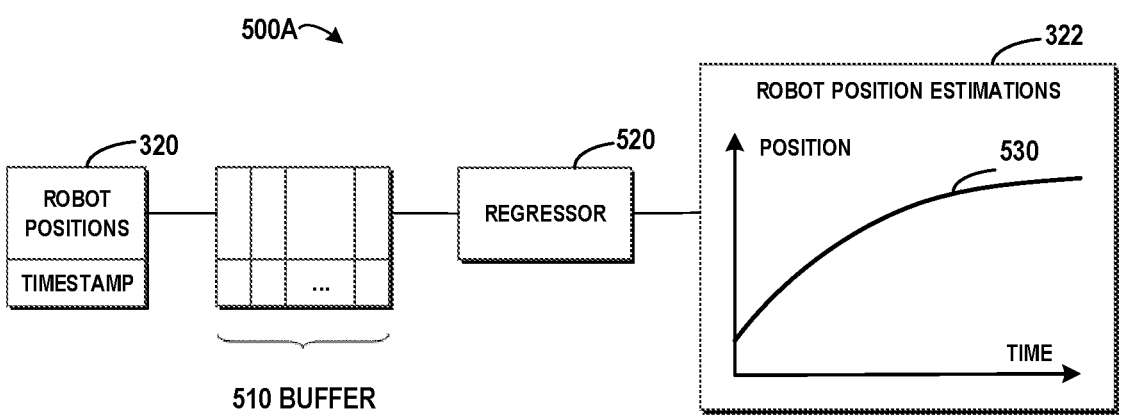
FIG. 5A illustrates a schematic diagram of a procedure for determining robot position estimations in accordance with embodiments of the present disclosure.

At block 430, target position estimations 330 are obtained based on the robot positions 310 and the sensed positions 320. Here, target robot position estimations 330 are associated with a sensor delay 340 of the robot system 100 caused by the sensor 140. FIG. 5A illustrates a schematic diagram of a procedure 500A for determining robot position estimations 322 in accordance with embodiments of the present disclosure. In FIG. 5A, the robot positions 320 with timestamps may be used for determining the robot position estimations 322. For example, positions at multiple time points may be stored into a buffer 510 and then inputted into a regressor 520.

In FIG. 5A, the horizontal axis represents the time and the vertical axis represents the position of the robot system 100 during the movements. Based on a regress operation, the regressor 520 may generate a polynomial 530 for representing a relationship between the time points and the robot position estimations 322, and then output the robot position estimations 322. The robot position estimations 322 depend on the robot position at a given time point and the sensor delay. Here the robot position estimations 322 is associated with the sensor delay, where the sensor delay is considered as an unknown parameter and will be determined in a future step.

Figure 5B:
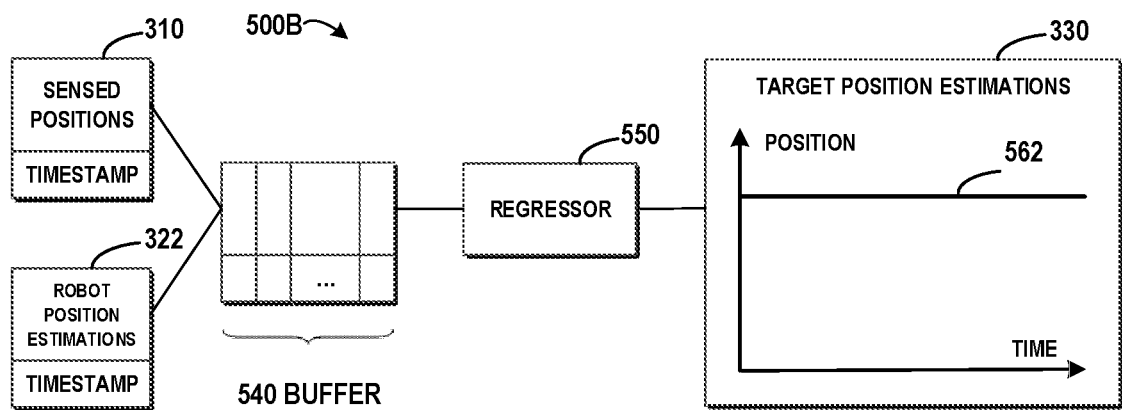
FIG. 5B illustrates a schematic diagram of a procedure for determining target position estimations in accordance with embodiments of the present disclosure.

FIG. 5B illustrates a schematic diagram of a procedure 500B for determining target position estimations 330 in accordance with embodiments of the present disclosure. In FIG. 5B, the sensed positions 310 and the robot position estimations 322 are inputted into a buffer 540 for a regression operation by a regressor 550. In the robot system 100, the sensor 140 may relate to two types. If the sensor 140 measures a position of the target 150 directly, the sensed position 310 may be directly inputted into the regressor 540 for determining the robot position estimation 322. If the sensor 140 measures a delta value of the target 150, then the sensed positions 310 may be fused with the robot positions 320 for positions of the target 150. Then, the fused positions are inputted into the regressor 540 for determining the target position estimations 330. Then, the target position estimations 330 may be determined. For example, a line 562 may be determined, compared with the polynomial 530 determined initially, the line 562 is more accurate and can reflect the real position of the target 150.

In some embodiments, the target position estimations 330 may be determined based on a geometry relationship between the robot position estimations 322 and the sensed positions 310 at a plurality of time points during the movement. Specifically, in some embodiments, the geometry relationship may be represented by the following Formula 1.

$$pos_{target,est}(t)=pos_{robot,est}(t-t_{delay,sensor})+ \\ \alpha_{sensor}pos_{sensor}(t) \qquad \text{Formula 1}$$

Where t represents a time point during the movement of the robot system, $pos_{target,est}(t)$ represents a target position estimation at the time point t, $t_{delay,sensor}$ represents the sensor delay, $pos_{robot,est}(t-t_{delay,sensor})$ represents a robot position estimation at the time point $(t-t_{delay,\ sensor})$ (which is outputted by the regressor 520), $pos_{sensor}(t)$ represents a sensed position at the time point t, and $\alpha_{sensor}$ represents a scaling factor for the sensor.

The preceding paragraphs have described a determination of the target position estimations 330. Reference will be made back to FIG. 4 for a determination of the sensor delay 340. At block 440, the sensor delay 340 is determined based on the target position estimations 330. In some embodiments, a target position formula may be generated based on a target position of the target 150 and the target position estimations 330.

With the above geometry relationship in Formula 1, the target position formula may be generated based on a difference between the target position and target position estimations in the plurality of time points. As above difference relates to a distance caused by the sensor delay 340, with these embodiments, the sensor delay 340 may be determined by minimizing the difference in an effective way. Specifically, the target position formula may be generated according to Formula 2 as below:

$$\min \sum_{i=1}^{n}\left(pos_{target} - pos_{target,est}(t_i)\right)^2 \qquad \text{Formula 2}$$

When Formula 1 is combined into the Formula 2, the following formula 2.1 may be obtained.

$$\min \sum_{i=1}^{n}\left(pos_{target} - \\ \left(pos_{robot,est}(t_i - t_{delay,sensor}) + \alpha_{sensor}\,pos_{sensor}(t_i)\right)\right)^2 \qquad \text{Formula 2.1}$$

Where $pos_{target}$ represents a target position of the target, n represents the number of time points during the movement, $t_i$ represents the $i^{th}$ time point during the movement, and other parameters have the same meaning as those in Formula 1. Formula 2.1 includes 3 unknown parameters: $pos_{target}$, $t_{delay,sensor}$ and $\alpha_{sensor}$, while other parameters may be determined from the above disclosure.

In some embodiments, the above Formula 2.1 may be solved so as to determine the unknown parameters under a constrain of minimizing Formula 2. In the present disclosure, the unknown sensor delay 340 may be determined based on approaches that have been proposed by now or to be developed in the future, and details for solving the Formula 2.1 are omitted hereinafter. With these embodiments, a determination of the sensor delay 340 is converted into solving the target position formula, therefore the sensor delay 340 may be determined in a simple and effective way. In some embodiments, the method 400 may be implemented as the robot system 100 runs, such that the precision of the sensor delay 340 may be improved gradually.

It is known that the sensor delay 340 is an important factor that influences the precision for the target position estimation, therefore the determined sensor delay 340 may be used to correct a target position of the target 150 at a given time point. Specifically, a corrected target position of the target at the given time point may be determined based on the sensor delay 340 and a sensed position at the given time point. For example, the target position at the time point $t_k$ may be determined as below:

$$pos_{target,est}(t_k)=pos_{robot,est}(t_k-t_{delay,sensor})+ \\ \alpha_{sensor}pos_{sensor}(t_k) \qquad \text{Formula 3}$$

Where $t_k$ represents a time point during the movement of the robot system, $pos_{target,est}(t_k)$ represents a corrected target position at the time point $t_k$, $t_{delay,sensor}$ represents the sensor delay determined according to the present disclosure, $pos_{robot,est}(t_k-t_{delay,sensor})$ represents a robot position estimation at the time point $(t_k-t_{delay,sensor})$, $pos_{sensor}(t_k)$ represents a sensed position at the time point $t_k$, and $\alpha_{sensor}$ represents a scaling factor for the sensor 140. With these embodiments, the sensor delay 340 may be used to correct a target position at a future time point so as to compensate errors in the target position estimation caused by the sensor delay 340.

The preceding paragraphs have described the determination of the sensor delay 340. During the tuning procedure, other parameters such as the robot delay also influence the precision of movements of the robot system 100, therefore it is required to determine the robot delay for further improving the performance of the robot system 100. In the robot system 100, the controller 110 generates velocity commands for controlling a further movement of the robot system 100 based on the current states of the robot system 100. However, a robot delay is caused due to the time cost for processing data by the controller 110, and thus an error may occur in the robot position.

In some embodiments, velocity commands for controlling the robot system 100 may be determined. Here, the velocity commands vary at different time points, and thus a velocity command may be determined at one of the plurality of time points during the movement. It is to be understood that the velocity command aims at adjusting a velocity of the robot system 100, such that the robot system 100 may reach the position of the target 150 according to the predetermined accuracy.

Generally, the robot system 100 may move towards the target 150, and rules for adjusting the velocity may include: if the arm does not reach a desired position at a time point, the velocity may be increased; if the arm reaches the desired position at the time point, the velocity may be unchanged; and if the arm exceeds the desired position at the time point, the velocity may be decreased. Further, when an accuracy is considered, the desired position may become a desired range defined by the accuracy and the desired position. A position error of the robot system may be identified at each time point during the movement. Specifically, the position error may be identified based on a position estimation and a robot position estimation at the time point according to Formula 4 as below:

$$pos_{error}(t) = pos_{target,est}(t) - pos_{robot,est}(t) \qquad \text{Formula 4}$$

Where $pos_{error}(t)$ represents a position error of the robot system at the time point t during the movement, $pos_{target,est}(t)$ represents a target position estimation, and $pos_{robot,est}(t)$ represents a robot position estimation. With these embodiments, the position error may be determined at each time point during the movement, therefore the position error may be determined in a fine granularity.

According to the above rules, a velocity command for each time point may be determined based on a comparison of the position error and the accuracy based on the above rules. Specifically, Formula 5 may be used for determining the velocity command.

$$vel_{command}(t) =$$

$$\begin{cases} K_p(pos_{error}(t) - accuracy), & pos_{error}(t) - accuracy > 0 \\ 0, & -accuracy < pos_{error}(t) < accuracy \\ K_p(pos_{error}(t) + accuracy), & pos_{error}(t) + accuracy < 0 \end{cases}$$

Formula 5

Where $vel_{command}(t)$ represents a velocity command at the time point t, $K_p$ represents a strength for controlling the robot system 100, $pos_{error}(t)$ represents a position error of the robot system at the time point t, and accuracy represents the predetermined accuracy. The velocity commands are important parameters for controlling the robot system. With these embodiments, the velocity command may be determined by a simple and effective way based on a comparison operation.

In some embodiments, the robot delay caused by the controller 110 may be determined based on the velocity commands and the robot positions 320. As the robot delay affects the precision of the robot system 100, with these embodiments, the robot delay may be determined effectively so as to further correcting movement of the robot system 100.

In some embodiments, in order to determine the robot delay, a robot position formula may be generated based on a geometry relationship between the robot delay, the robot positions, and the velocity commands at the plurality of time points. Specifically, Formula 6 may be used for generating the robot position formula.

$$\min \sum_{i=1}^{n} \left( pos_{robot}(t_i) - \int_{0}^{t_i + t_{delay,robot}} vel_{command}(t)dt - \alpha - \beta t_i \right) \qquad \text{Formula 6}$$

Where $pos_{robot}(t_i)$ represents a robot position at the time point $t_i$, $t_{delay,robot}$ represents the robot delay of the robot system (which is an unknown parameter), $vel_{command}(t)$ represents the velocity command, and $\alpha$ and $\beta$ represent differences between the robot positions and the robot position estimations. Formula 6 includes 3 unknown parameters: $t_{delay,robot}$, $\alpha$ and $\beta$. By solving the above Formula 6 under a constrain of minimizing the above formula, the robot delay may be determined. With these embodiments, a determination of the robot delay is converted into solving the robot position, therefore the robot delay may be determined in a simple and effective way.

In some embodiments, a corrected robot position of the robot system 100 at the given time point may be determined by updating a robot position of the robot system 100 at the given time point with the robot delay and the velocity command at the given time point. With these embodiments, the determined robot delay may be used to correct a robot position at a future time point so as to compensate errors in the robot position caused by the robot delay.

It is known that the robot delay is an important factor that influences the precision of the robot position estimation, therefore the determined robot delay may be used to correct a robot position at a given time point. Specifically, a corrected robot position at the given time point may be determined based on the robot delay and a robot position at the given time point. For example, the robot position at the time point $t_k$ may be determined as below:

$$pos_{robot,est}(t_k) = pos_{robot}(t_k) + \int_{t_k - t_{delay,robot}}^{t_k} vel_{command}(t)dt \qquad \text{Formula 7}$$

Where $t_k$ represents a time point during the movement of the robot system, $pos_{robot,est}(t_k)$ represents a corrected robot position at the time point $t_k$, $t_{delay,robot}$ represents the robot delay determined according to the above paragraphs, and $vel_{command}(t)$ represents the velocity command at a time point t.

Figure 6:
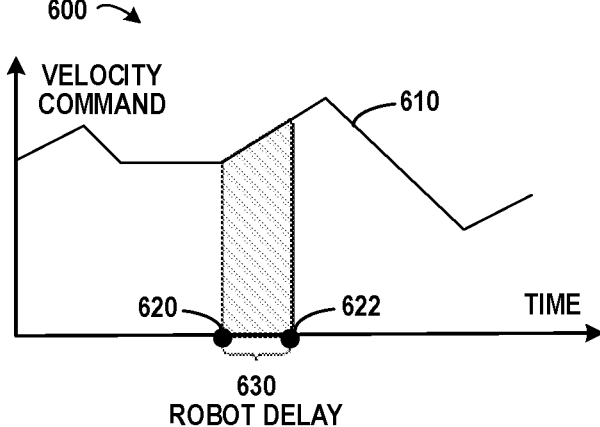
FIG. 6 illustrates a schematic diagram of determining an error caused by a robot delay in a robot system in accordance with embodiments of the present disclosure.

Reference will be made to FIG. 6 for details about the Formula 7. FIG. 6 illustrates a schematic diagram 600 of determining an error caused by a robot delay in a robot system 100 in accordance with embodiments of the present disclosure. The horizontal axis in FIG. 6 represents the time and the vertical axis represents the velocity command. As shown, the velocity command is indicated by a curve 610, the time points 622 represents the time point $t_k$, and the time point 620 represent a time point related to the robot delay 630. During the movement of the robot system 100, the arm may move forward and cover a distance as calculated by $$\int_{t_k-t_{delay,robot}}^{t_k} vel_{command}(t)dt.$$

Accordingly, the robot position estimation at the time point $t_k$ may be determined according to a sum of the robot position at the time point $t_k$ and the distance moved during the robot delay. With these embodiments, the real robot position at the time point $t_k$ may be determined in a more accurate and effective way, such that movements of the robot system 100 may be controlled with an increased precision.

Figure 7:
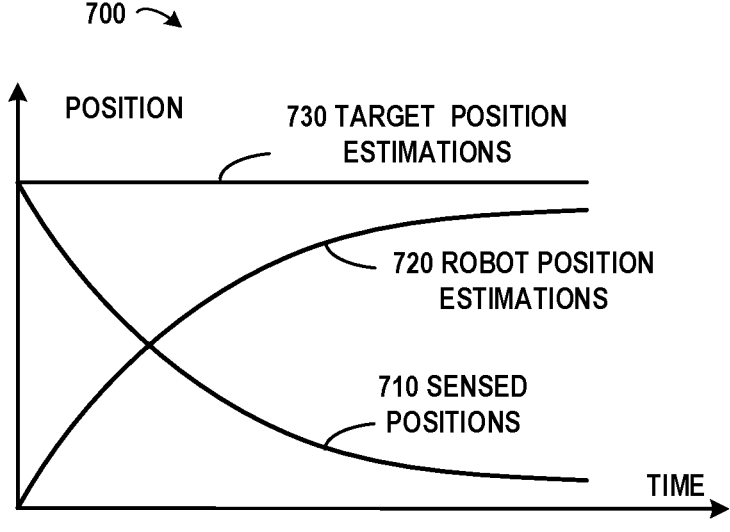
FIG. 7 illustrates a schematic diagram of a relationship between target position estimations, robot position estimations and sensed positions in accordance with embodiments of the present disclosure.

FIG. 7 illustrates a schematic diagram of a relationship 700 between target position estimations, robot position estimations and sensed positions in accordance with embodiments of the present disclosure. The horizontal axis represents the time during the movement of the robot system 100, and the vertical axis represents various positions obtained during the movement. A curve 710 represents the sensed positions of the target 150, and a curve 720 represents robot position estimations determined according to the present disclosure. The target position is based on a sum of the sensed positions and the robot position estimations, and the target position estimations determined according to the present disclosure show a straight line and remains unchanged during the movement, which is consistent with the fact that the target 150 locates at a fixed position. Compared with the traditional solution where the target position estimations vary, the present disclosure may provide a more precise way for determining the real target position.

In some embodiments, more parameters may be determined based on the sensor delay and the robot delay during the tuning procedure. For example, a buffer length of the robot system 100 for the regression procedure may be determined. Alternatively and/or in addition to, a strength for controlling the velocity commands and a dead zone of the robot system may be determined. In these embodiments, the above parameters may be determined based on the sensor delay and the robot delay according to any method which has been proposed or to be developed in the future, and details of the determination are omitted hereinafter. It is to be known that the sensor delay and the robot delay significantly affect the precision for controlling the robot system 100. With these embodiments, more controlling parameters may be determined during the tuning procedure, so as to ensure that the robot system 100 may run in an accurate and effective way.

With the present disclosure, the engineer is not required to have rich knowledge about controlling parameters during the tuning procedure. Instead, the engineer only needs to input the desired running velocity and accuracy, and then press a button for triggering the automatic tuning procedure. Therefore, knowledge background is not required anymore and the robot system 100 may be controlled in a simple and effective way. Further, errors caused by the time delays are compensated and thus the robot system 100 may move at a higher velocity effectively.

Figure 8:
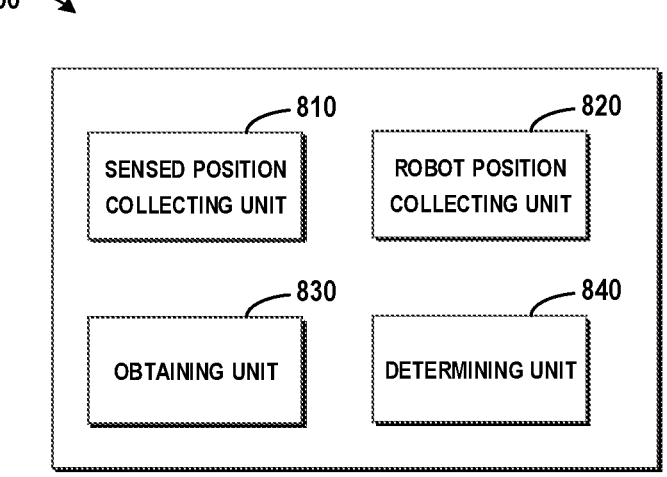
FIG. 8 illustrates a schematic diagram of an apparatus for tuning a robot system in accordance with embodiments of the present disclosure.

The preceding paragraphs have provided detailed steps of the method 400, in other embodiments of the present disclosure, the method 400 may be implemented by an apparatus. FIG. 8 illustrates a schematic diagram of an apparatus 800 for tuning a robot system in accordance with embodiments of the present disclosure. The apparatus 800 comprises: a sensed position collecting unit 810, being configured for collecting, from a sensor of the robot system, sensed positions of a target that is processed by the robot system during a movement of the robot system at a predetermined velocity and a predetermined accuracy; a robot position collecting unit 820, being configured for collecting, from a controller of the robot system, robot positions of the robot system during the movement; an obtaining unit 830, being configured for obtaining target position estimations based on the robot positions and the sensed positions, the target position estimations being associated with a sensor delay of the robot system caused by the sensor; and a determining unit 840, being configured for determining the sensor delay based on the target position estimations.

In some embodiments, the obtaining unit 830 comprises: a robot position estimating unit, being configured for determining robot position estimations based on a regression operation on the robot positions; and a target position estimating unit, being configured for obtaining the target position estimations based on a geometry relationship between the robot position estimations and the sensed positions at a plurality of time points during the movement.

In some embodiments, the determining unit 840 comprises: a generating unit, being configured for generating a target position formula based on a target position of the target and the target position estimations; and a sensor delay determining unit, being configured for determining the sensor delay by solving the target position formula, such that the determined sensor delay minimizes the target position formula.

In some embodiments, the apparatus 800 further comprises: a target position determining unit, being configured for determining a corrected target position of the target at a given time point based on the sensor delay and a sensed position at the given time point.

In some embodiments, the apparatus 800 further comprises: a command obtaining unit, being configured for obtaining velocity commands for controlling the robot system at the plurality of time points; and a robot delay determining unit, being configured for determining a robot delay caused by the controller based on the velocity commands and the robot positions.

In some embodiments, the command obtaining unit comprises: an identifying unit, being configured for identifying a position error of the robot system at the time point with respect to a time point in the plurality of time points; and a velocity command obtaining unit, being configured for obtaining a velocity command in the velocity commands based on a comparison of the position error and the accuracy.

In some embodiments, the identifying unit comprises: an error identifying unit, being configured for identifying the position error based on a target position estimation and a robot position estimation at the time point.

In some embodiments, the robot delay determining unit comprises: a robot position formula generating unit, being configured for generating a robot position formula based on a geometry relationship between the robot delay, the robot positions, and the velocity commands at the plurality of time points; and a solving unit, being configured for determining the robot delay by solving the robot position formula, such that the determined robot delay minimizes the robot position formula.

In some embodiments, the apparatus 800 further comprises: a robot position determining unit, being configured for determining a corrected robot position of the robot system at the given time point by updating a robot position of the robot system at the given time point with the robot delay and the velocity command at the given time point.

In some embodiments, the apparatus 800 further comprises: a parameter determining unit, being configured for determining a parameter for controlling the robot system based on the sensor delay and the robot delay, the parameter comprises any of: a buffer length of the robot system, a strength for controlling the velocity commands, and a dead zone of the robot system.

Figure 9:
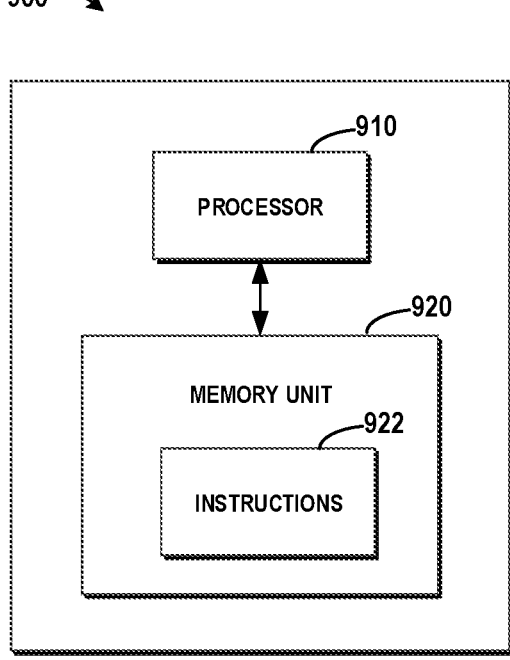
FIG. 9 illustrates a schematic diagram of a system for tuning a robot system in accordance with embodiments of the present disclosure.

In some embodiments of the present disclosure, a system 900 for tuning a robot system is provided. FIG. 9 illustrates a schematic diagram of the system 900 for tuning a robot system in accordance with embodiments of the present disclosure. As illustrated in FIG. 9, the system 900 may comprise a computer processor 910 coupled to a computer-readable memory unit 920, and the memory unit 920 comprises instructions 922. When executed by the computer processor 910, the instructions 922 may implement the method 400 for tuning a robot system as described in the preceding paragraphs, and details will be omitted hereinafter.

In some embodiments of the present disclosure, a computer readable medium for tuning a robot system is provided. The computer readable medium has instructions stored thereon, and the instructions, when executed on at least one processor, may cause at least one processor to perform the method for tuning a robot system as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for tuning a robot system, comprising:
collecting, from a sensor of the robot system, sensed positions of a target that is processed by the robot system during a movement of the robot system at a predetermined velocity and a predetermined accuracy;
collecting, from a controller of the robot system, robot positions of the robot system during the movement;
obtaining target position estimations based on the robot positions and the sensed positions, the target position estimations being associated with a sensor delay of the robot system caused by the sensor;
wherein obtaining the target position estimations comprises:

determining robot position estimations based on a regression operation on the robot positions; and obtaining the target position estimations based on a geometry relationship between the robot position estimations and the sensed positions at a plurality of time points during the movement; and determining the sensor delay based on the target position estimations.

2. The method of claim 1, wherein determining the sensor delay comprises:

generating a target position formula based on a target position of the target and the target position estimations; and determining the sensor delay by solving the target position formula, such that the determined sensor delay minimizes the target position formula.

3. The method of claim 1, further comprising: determining a corrected target position of the target at a given time point based on the sensor delay and a sensed position at the given time point.

4. The method of claim 3, further comprising:

obtaining velocity commands for controlling the robot system at the plurality of time points; and determining a robot delay caused by the controller based on the velocity commands and the robot positions.

5. The method of claim 4, wherein obtaining the velocity commands comprises: with respect to a time point in the plurality of time points, identifying a position error of the robot system at the time point; and obtaining a velocity command in the velocity commands based on a comparison of the position error and the accuracy.

6. The method of claim 5, wherein identifying the position error comprises: identifying the position error based on a target position estimation and a robot position estimation at the time point.

7. The method of claim 4, wherein determining the robot delay comprises:

generating a robot position formula based on a geometry relationship between the robot delay, the robot positions, and the velocity commands at the plurality of time points; and determining the robot delay by solving the robot position formula, such that the determined robot delay minimizes the robot position formula.

8. The method of claim 4, further comprising: determining a corrected robot position of the robot system at the given time point by updating a robot position of the robot system at the given time point with the robot delay and the velocity command at the given time point.

9. The method of claim 4, further comprising: determining a parameter for controlling the robot system based on the sensor delay and the robot delay, the parameter comprises any of: a buffer length of the robot system, a strength for controlling the velocity commands, and a dead zone of the robot system.

10. An apparatus for tuning a robot system, comprising:

a sensed position collecting unit, being configured for collecting, from a sensor of the robot system, sensed positions of a target that is processed by the robot system during a movement of the robot system at a predetermined velocity and a predetermined accuracy;

a robot position collecting unit, being configured for collecting, from a controller of the robot system, robot positions of the robot system during the movement;

an obtaining unit, being configured for obtaining target position estimations based on the robot positions and the sensed positions, the target position estimations being associated with a sensor delay of the robot system caused by the sensor;

wherein the obtaining unit comprises:

a robot position estimating unit, being configured for determining robot position estimations based on a regression operation on the robot positions; and a target position estimating unit, being configured for obtaining the target position estimations based on a geometry relationship between the robot position estimations and the sensed positions at a plurality of time points during the movement; and a determining unit, being configured for determining the sensor delay based on the target position estimations.

11. The apparatus of claim 10, wherein the determining unit comprises:

a generating unit, being configured for generating a target position formula based on a target position of the target and the target position estimations; and a sensor delay determining unit, being configured for determining the sensor delay by solving the target position formula, such that the determined sensor delay minimizes the target position formula.

12. The apparatus of claim 10, the apparatus further comprises: a target position determining unit, being configured for determining a corrected target position of the target at a given time point based on the sensor delay and a sensed position at the given time point.

13. The apparatus of claim 12, the apparatus further comprises:

a command obtaining unit, being configured for obtaining velocity commands for controlling the robot system at the plurality of time points; and a robot delay determining unit, being configured for determining a robot delay caused by the controller based on the velocity commands and the robot positions.

14. The apparatus of claim 13, wherein the command obtaining unit comprises:

an identifying unit, being configured for identifying a position error of the robot system at the time point with respect to a time point in the plurality of time points; and a velocity command obtaining unit, being configured for obtaining a velocity command in the velocity commands based on a comparison of the position error and the accuracy.

15. The apparatus of claim 14, wherein the identifying unit comprises: an error identifying unit, being configured for identifying the position error based on a target position estimation and a robot position estimation at the time point.

16. The apparatus of claim 13, wherein the robot delay determining unit comprises:

a robot position formula generating unit, being configured for generating a robot position formula based on a geometry relationship between the robot delay, the robot positions, and the velocity commands at the plurality of time points; and a solving unit, being configured for determining the robot delay by solving the robot position formula, such that the determined robot delay minimizes the robot position formula.

17. The apparatus of claim 13, the apparatus further comprises: a robot position determining unit, being configured for determining a corrected robot position of the robot system at the given time point by updating a robot position of the robot system at the given time point with the robot delay and the velocity command at the given time point.

18. The apparatus of claim 13, the apparatus further comprises: a parameter determining unit, being configured for determining a parameter for controlling the robot system based on the sensor delay and the robot delay, the parameter comprises any of: a buffer length of the robot system, a strength for controlling the velocity commands, and a dead zone of the robot system.

19. A system for tuning a robot system, comprising: a computer processor coupled to a computer-readable memory unit, the memory unit comprising instructions that when executed by the computer processor implements the method according to claim 1.

20. A non-transitory computer readable medium having instructions stored thereon, the instructions, when executed on at least one processor, cause the at least one processor to perform the method according to claim 1.

\* \* \* \* \*